US011181307B2

(12) United States Patent
Nakajima et al.

(10) Patent No.: US 11,181,307 B2
(45) Date of Patent: Nov. 23, 2021

(54) AIR CONDITIONER AND EXPANSION VALVE CONTROL THEREOF

(71) Applicant: Mitsubishi Electric Corporation, Tokyo (JP)

(72) Inventors: Komei Nakajima, Tokyo (JP); Haruo Nakano, Tokyo (JP); Hideki Tsukino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 21 days.

(21) Appl. No.: 16/763,321

(22) PCT Filed: Nov. 22, 2017

(86) PCT No.: PCT/JP2017/041952
§ 371 (c)(1),
(2) Date: May 12, 2020

(87) PCT Pub. No.: WO2019/102538
PCT Pub. Date: May 31, 2019

(65) Prior Publication Data
US 2020/0318877 A1    Oct. 8, 2020

(51) Int. Cl.
*F25B 49/02*    (2006.01)
*F25B 41/31*    (2021.01)
(Continued)

(52) U.S. Cl.
CPC ............... *F25B 41/31* (2021.01); *F25B 5/02* (2013.01); *F25B 6/02* (2013.01); *F24F 11/84* (2018.01);
(Continued)

(58) Field of Classification Search
CPC .............. F25B 41/31; F25B 2600/2513; F25B 2700/21152; F25B 2700/21163; F25B 2700/21174
See application file for complete search history.

(56) References Cited

U.S. PATENT DOCUMENTS

| 4,841,734 A * | 6/1989 | Torrence ............ B60H 1/00978 |
| | | 374/27 |
| 2009/0211281 A1* | 8/2009 | Chang ................... F25B 49/005 |
| | | 62/231 |

(Continued)

FOREIGN PATENT DOCUMENTS

| JP | 5245576 B | 7/2013 |
| JP | 6058032 B | 1/2017 |
| JP | 2017-101918 A | 7/2017 |

*Primary Examiner* — Jonathan Bradford
(74) *Attorney, Agent, or Firm* — Posz Law Group, PLC

(57) ABSTRACT

An air conditioner allows refrigerant to circulate therethrough. The air conditioner includes a compressor, a first heat exchanger, a first expansion valve, a second heat exchanger, and a controller. The controller changes an opening degree of the first expansion valve by a first operation amount according to a temperature difference between a target temperature and the temperature of the refrigerant discharged by the compressor. The refrigerant circulates through the compressor, the first heat exchanger, the first expansion valve, and the second heat exchanger. A first ratio when a specific condition is satisfied is larger than a second ratio when the specific condition is not satisfied. The specific condition indicates that the degree of subcooling of the refrigerant flowing between the first heat exchanger and the first expansion valve is smaller than zero. The first and second ratios are each a ratio of the first operation amount to the temperature difference.

4 Claims, 9 Drawing Sheets

(51) Int. Cl.
*F25B 5/02* (2006.01)
*F25B 6/02* (2006.01)
F24F 140/20 (2018.01)
F25B 13/00 (2006.01)
F24F 11/84 (2018.01)

(52) U.S. Cl.
CPC ........... *F24F 2140/20* (2018.01); *F25B 13/00* (2013.01); *F25B 49/02* (2013.01); *F25B 2313/0233* (2013.01); *F25B 2313/0314* (2013.01); *F25B 2313/0315* (2013.01); *F25B 2500/19* (2013.01); *F25B 2600/2513* (2013.01); *F25B 2700/21152* (2013.01); *F25B 2700/21163* (2013.01); *F25B 2700/21174* (2013.01)

(56) References Cited

U.S. PATENT DOCUMENTS

| | | | |
|---|---|---|---|
| 2015/0330675 A1 | 11/2015 | Tamaki et al. | |
| 2015/0330689 A1* | 11/2015 | Kato | F25B 49/022 62/115 |
| 2015/0362199 A1* | 12/2015 | Yumoto | F24F 5/001 62/228.1 |
| 2015/0362238 A1* | 12/2015 | Tanaka | F25B 49/02 62/115 |
| 2017/0234582 A1* | 8/2017 | Hatomura | F25B 41/37 62/160 |
| 2017/0276391 A1* | 9/2017 | Tanaka | F25B 49/02 |

\* cited by examiner

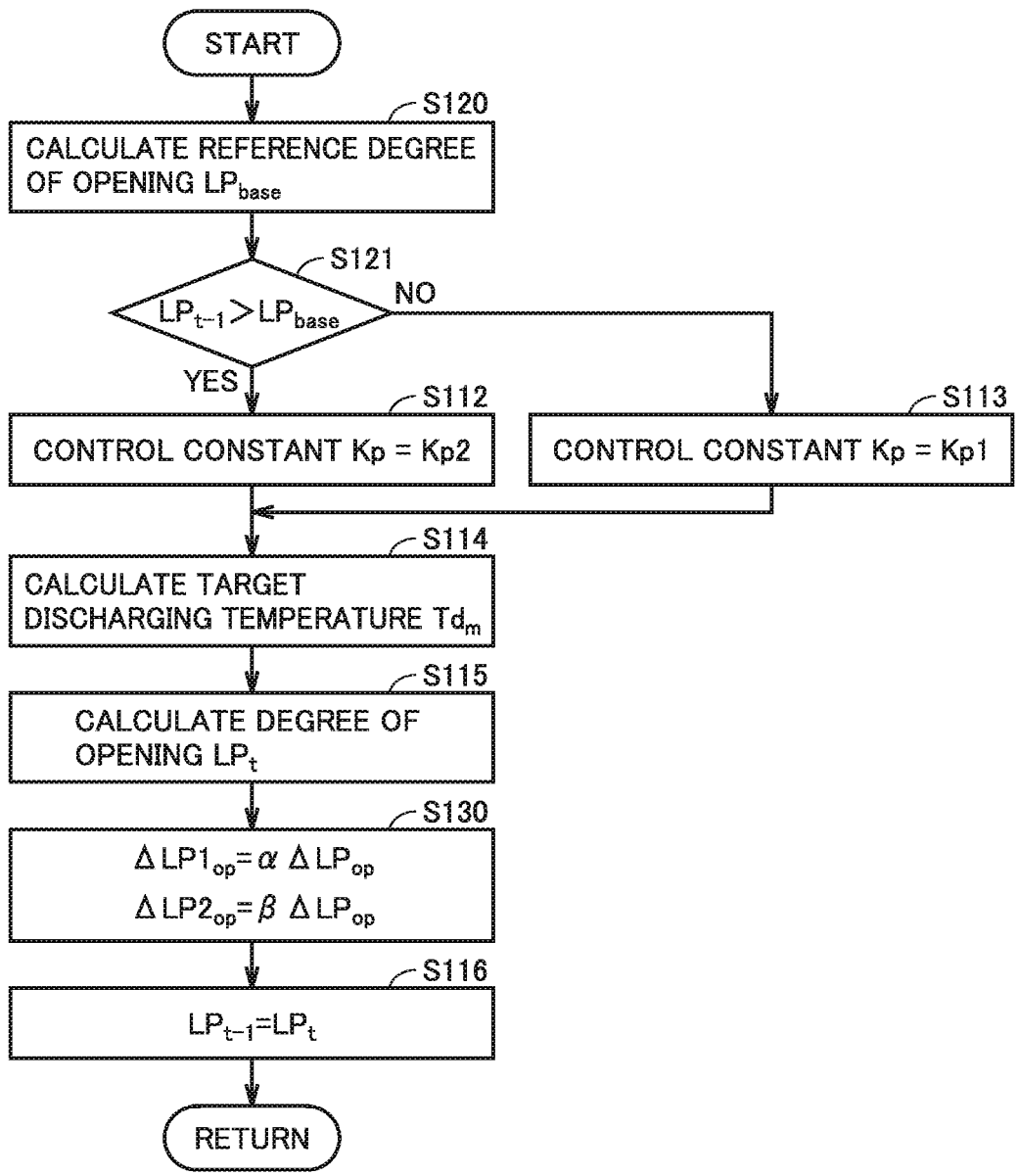

AIR CONDITIONER AND EXPANSION VALVE CONTROL THEREOF

CROSS REFERENCE TO RELATED APPLICATION

This application is a U.S. national stage application of PCT/JP2017/041952 filed on Nov. 22, 2017, the contents of which are incorporated herein by reference.

TECHNICAL FIELD

The present invention relates to an air conditioner having a function to sense that refrigerant has an insufficient amount.

BACKGROUND ART

A conventionally known air conditioner has a function to sense that refrigerant has an insufficient amount. For example, Japanese Patent No. 5245576 (PTL1) discloses an air conditioner that determines whether an amount of refrigerant is appropriate within a range of environmental conditions under which a sensing error is maximally reduced. This air conditioner can reduce erroneous sensing of refrigerant in amount.

CITATION LIST

Patent Literature

PTL1: Japanese Patent No. 5245576

SUMMARY OF INVENTION

Technical Problem

In the air conditioner disclosed in Japanese Patent No. 5245576 (PTL 1), when a degree of subcooling of the refrigerant flowing out of a condenser is equal to or less than a reference value, it is determined that the refrigerant has an insufficient amount.

When the amount of refrigerant circulating through an air conditioner (an amount of refrigerant in circulation) has decreased and it becomes difficult to sufficiently cool the refrigerant by a condenser, the condenser discharges the refrigerant with a degree of subcooling smaller than 0, and an expansion valve receives the refrigerant in a gas-liquid two-phase state (or wet steam). Normally, the expansion valve has its degree of opening controlled on the assumption that the expansion valve receives refrigerant in the form of liquid (or liquid refrigerant). Therefore, when the expansion valve receives refrigerant in the form of wet steam, the air conditioner may be impaired in stability.

The present invention has been made to solve the above-described problem, and an object of the present invention is to improve an air conditioner in stability.

Solution to Problem

According to the present invention, an air conditioner circulates refrigerant. The air conditioner comprises: a compressor; a first heat exchanger; a first expansion valve; a second heat exchanger; and a controller. The controller changes a degree of opening of the first expansion valve by a first operation amount according to a temperature difference between a target temperature and the temperature of the refrigerant discharged by the compressor. The refrigerant circulates through the compressor, the first heat exchanger, the first expansion valve, and the second heat exchanger. A first ratio when a specific condition is satisfied is larger than a second ratio when the specific condition is not satisfied. The specific condition indicates that a degree of subcooling of the refrigerant flowing between the first heat exchanger and the first expansion valve is smaller than zero. The first and second ratios are each a ratio of the first operation amount to the temperature difference.

Advantageous Effects of Invention

According to the present invention, an air conditioner can be improved in stability by making a first ratio when a specific condition indicating that refrigerant flowing between a first heat exchanger and a first expansion valve has a degree of subcooling smaller than zero is satisfied larger than a second ratio when the specific condition is not satisfied.

BRIEF DESCRIPTION OF DRAWINGS

FIG. 10 is a flowchart of a process performed by a controller shown in FIGS. 8 and 9 for controlling the first expansion valve and a second expansion valve in degree of opening through feedback whenever a sampling time arrives.

DESCRIPTION OF EMBODIMENTS

Hereinafter, embodiments of the present invention will specifically be described with reference to the drawings. In the figures, identical or corresponding components are identically denoted and will not be described redundantly in principle.

First Embodiment

Figure 1:
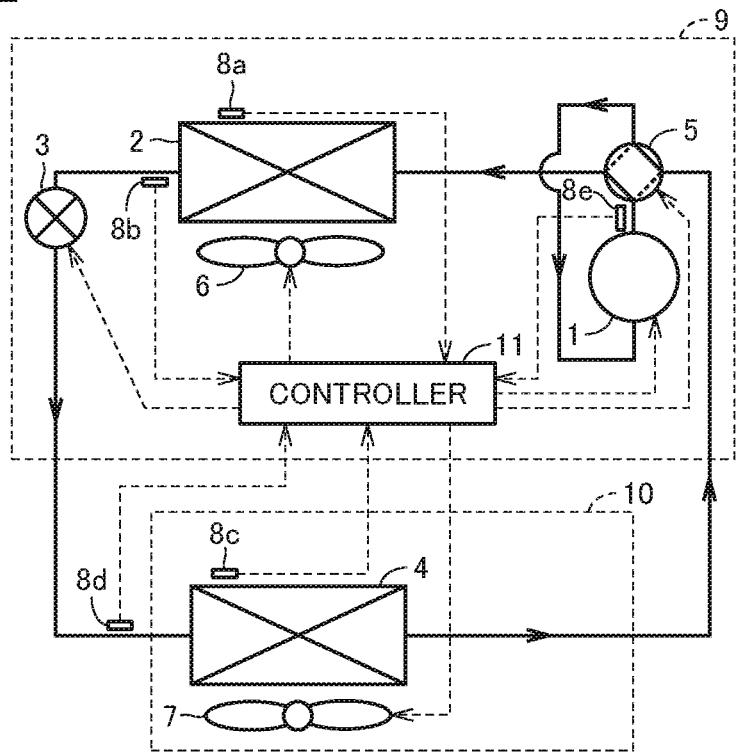
FIG. 1 is a functional block diagram showing a functional configuration of an air conditioner according to a first embodiment together with how refrigerant flows in a cooling operation.
Figure 2:
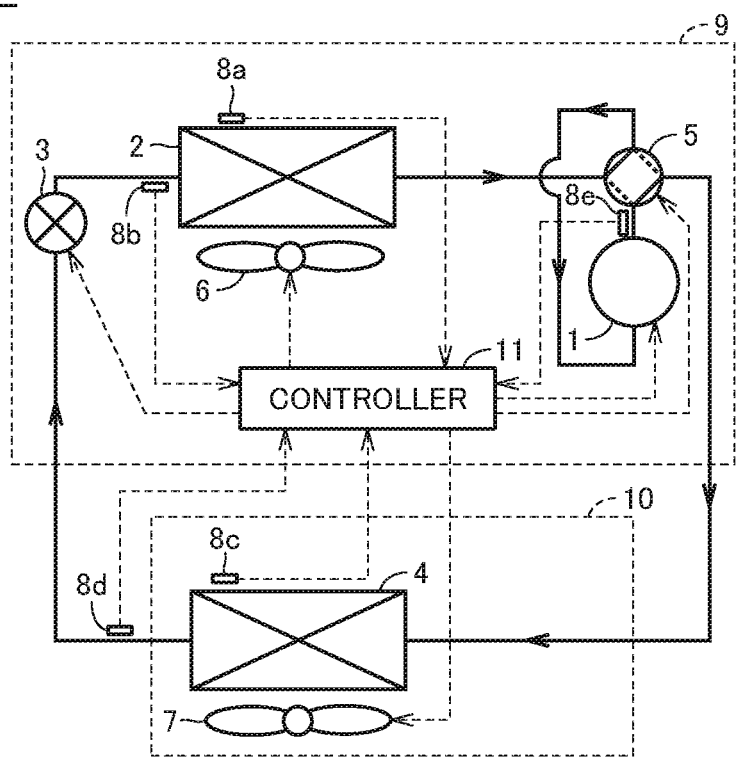
FIG. 2 is a functional block diagram showing the functional configuration of the air conditioner according to the first embodiment together with how refrigerant flows in a heating operation.

FIGS. 1 and 2 are functional block diagrams showing a functional configuration of an air conditioner 100 according to a first embodiment. FIG. 1 shows how refrigerant flows in a cooling operation. FIG. 2 shows how the refrigerant flows in a heating operation.

As shown in FIG. 1, air conditioner 100 includes an outdoor unit 9 and an indoor unit 10. Outdoor unit 9 includes a compressor 1, an outdoor heat exchanger 2, a first expansion valve 3, a four-way valve 5, an outdoor fan 6, and a controller 11. Indoor unit 10 includes an indoor heat exchanger 4 and an indoor fan 7.

In the cooling operation, the refrigerant circulates in the order of compressor 1, four-way valve 5, outdoor heat exchanger 2, first expansion valve 3 and indoor heat exchanger 4. Compressor 1 adiabatically compresses and discharges refrigerant in the form of gas (or gas refrigerant). The gas refrigerant discharged by compressor 1 is guided to outdoor heat exchanger 2 by four-way valve 5. Outdoor heat exchanger 2 functions as a condenser in the cooling operation. In outdoor heat exchanger 2, the refrigerant radiates heat of condensation to the surrounding external air to become a high-pressure liquid refrigerant. Outdoor heat exchanger 2 discharges the high-pressure liquid refrigerant, which in turn passes through first expansion valve 3, when the refrigerant is reduced in pressure and thus becomes low-pressure wet steam and flows into indoor heat exchanger 4. Indoor heat exchanger 4 functions as an evaporator in the cooling operation. In indoor heat exchanger 4, the refrigerant exchanges heat with indoor air blown by indoor fan 7. The refrigerant cools the indoor air by absorbing heat of evaporation from the indoor air and becomes a low-pressure gas refrigerant. Indoor heat exchanger 4 releases the gas refrigerant, which is in turn guided to compressor 1 by four-way valve 5.

Referring to FIG. 2, in the heating operation, the refrigerant circulates in the order of compressor 1, four-way valve 5, indoor heat exchanger 4, first expansion valve 3 and outdoor heat exchanger 2. Compressor 1 discharges high-temperature and high-pressure gas refrigerant, which is in turn guided to indoor heat exchanger 4 by four-way valve 5. Indoor heat exchanger 4 functions as a condenser in the heating operation. In indoor heat exchanger 4, the refrigerant radiates heat of condensation to the surrounding indoor air and thus heats the indoor air, and thus becomes a high-pressure liquid refrigerant. Indoor heat exchanger 4 releases the high-pressure liquid refrigerant, which in turn passes through first expansion valve 3, when the refrigerant is reduced in pressure and thus becomes low-pressure wet steam and flows into outdoor heat exchanger 2. Outdoor heat exchanger 2 functions as an evaporator in the heating operation. In outdoor heat exchanger 2, the refrigerant absorbs heat of evaporation from external air and thus becomes a low-pressure gas refrigerant. Outdoor heat exchanger 2 releases the gas refrigerant, which is in turn guided to compressor 1 by four-way valve 5.

Controller 11 controls four-way valve 5 to switch a direction in which the refrigerant circulates. Controller 11 controls outdoor fan 6 and indoor fan 7 to blow air in an amount per unit time. Controller 11 controls a circulation flow rate Gr [kg/h] by changing a rotation speed Fz [rps] of compressor 1. When compressor 1 has a stroke volume Vst [cc] (i.e., an amount of refrigerant discharged by the compression mechanism of compressor 1 per rotation), sucks refrigerant having a density ρs [kg/m³], and has a volumetric efficiency ηv [dimensionless number] (i.e., a ratio of an amount of refrigerant discharged to the displacement of the compression mechanism of compressor 1) the circulation flow rate Gr is expressed by the following expression (1):

[expression 1]

$$Gr = V_{st} \cdot F_z \cdot 3600 \cdot 10^{-6} \cdot \rho_s \cdot \eta_v \quad (1).$$

Controller 11 obtains a discharging temperature from a temperature sensor 8e. Controller 11 obtains from a temperature sensor 8a the temperature of the refrigerant moving through outdoor heat exchanger 2. Controller 11 obtains from a temperature sensor 8b the temperature of the refrigerant flowing between outdoor heat exchanger 2 and first expansion valve 3. Controller 11 obtains from a temperature sensor 8d the temperature of the refrigerant flowing between indoor heat exchanger 4 and first expansion valve 3. Controller 11 obtains from a temperature sensor 8c the temperature of the refrigerant moving through indoor heat exchanger 4. In the cooling operation, controller 11 uses each temperature obtained from temperature sensors 8a and 8b to calculate a degree of subcooling SC. In the heating operation, controller 11 uses each temperature obtained from sensors 8c and 8d to calculate a degree of subcooling SC.

Controller 11 uses each temperature obtained from temperature sensors 8a to 8e to control the degree of opening of first expansion valve 3 through feedback to bring a discharging temperature Td closer to a target discharging temperature $Td_m$. Temperature sensors 8a to 8e each include a thermistor for example.

Controller 11 detects a condensation temperature Tc [° C.] and an evaporation temperature Te [° C.] from the temperatures obtained from temperature sensors 8a and 8c. Controller 11 calculates the target discharging temperature $Td_m$ [° C.] from the following expression (2) so as to maximize a COP (a coefficient of performance). In the expression (2), Pc [MPa] represents condensation pressure. Pe [MPa] represents evaporation pressure. Te [° C.] represents evaporation temperature. A1 represents a constant for ensuring a degree of superheating for the refrigerant sucked into compressor 1. Index n represents a polytropic index.

[expression 2]

$$Td_m = (T_e + 273.15 + A_1) \cdot (Pc/Pe)^{(n-1)/n} - 273.15 \quad (2).$$

The condensation pressure Pc and the evaporation pressure Pe can be calculated from the condensation temperature Tc and the evaporation temperature Te. For example, a value of 0 or more and 10 or less is used as the constant A1. For the polytropic index n, for example, a value of 1.2 or more and 1.4 or less is used with the efficiency of compressor 1 considered.

Whenever a sampling time arrives, controller 11 uses the expression (1) to calculate the target discharging temperature $Td_m$, and calculates a degree of opening $LP_t$ [Pulse] for first expansion valve 3 for the current time. When first expansion valve 3 immediately previously had a degree of opening represented as $LP_{t-1}$ [Pulse] and a control constant is represented as Kp, the degree of opening $LP_t$ can be expressed by the following expression (3):

[expression 3]

$$LP_t = LP_{t-1} + K_p(Td - Td_m) \quad (3).$$

When an amount of operation $(LP_t - LP_{t-1})$ for a degree of opening LP is represented as $\Delta LP_{op}$ and a temperature difference $(Td - Td_m)$ is represented as $\Delta Ta$, the amount of operation $\Delta LP_{op}$ is expressed by an expression (4):

[expression 4]

$$\Delta LP_{op} = K_p \cdot \Delta Ta \qquad (4)$$

From the expression (4), the control constant $K_p$ is expressed as a ratio of the amount of operation $\Delta LP_{op}$ to the temperature difference $\Delta Ta$ as indicated by an expression (5):

[expression 5]

$$K_p = \frac{\Delta LP_{op}}{\Delta Ta}. \qquad (5)$$

Figure 3:
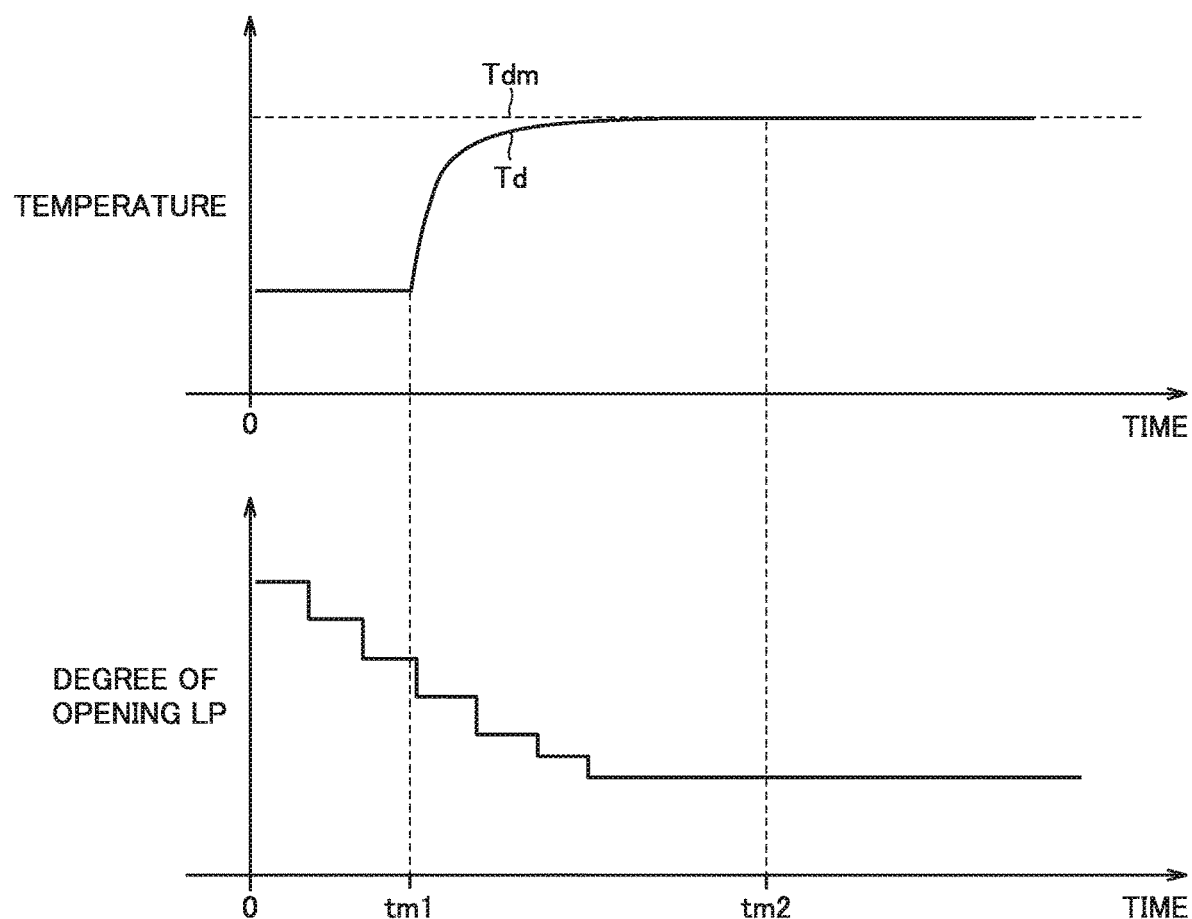
FIG. 3 is a timing plot for a discharging temperature and that for a degree of opening of a first expansion valve when refrigerant is circulated in a sufficient amount.

FIG. 3 is a timing plot for the discharging temperature Td and that for the degree of opening LP of first expansion valve 3 when refrigerant is circulated in a sufficient amount. FIG. 3 is timing plots immediately after air conditioner 100 is started. In FIG. 3, immediately after air conditioner 100 is started, the discharging temperature Td is lower than the target discharging temperature $Td_m$, and accordingly, the degree of opening LP is decreased by feedback control using the expression (2). When the degree of opening LP is decreased, the refrigerant circulates in a reduced amount, and a degree of superheating is easily ensured for the refrigerant sucked into compressor 1, and accordingly, the discharging temperature Td increases after time tm1. At time t2, the discharging temperature Td reaches the target discharging temperature $Td_m$, and the target discharging temperature $Td_m$ and the discharging temperature Td have a temperature difference substantially of zero. As a result, the degree of opening LP hardly changes and becomes stable.

When the refrigerant flowing into first expansion valve 3 has a pressure P1 [MPa] and the refrigerant flowing out of first expansion valve 3 has a pressure P2 [MPa], and the refrigerant flowing into first expansion valve 3 has a density $\rho l$ [MPa] [kg/m³], air conditioner 100 is stabilized when the degree of opening LP, the circulation flow rate Gr, the pressures P1 and P2, and the density $\rho l$ have a relationship expressed by the following expression (6):

[expression 6]

$$LP \propto \frac{Gr}{\sqrt{\rho_l(P_1 - P_2)}}. \qquad (6)$$

When the degree of opening LP is changed, the discharging temperature Td changes, and the state of the refrigerant sucked into compressor 1 also changes, and accordingly, the circulation flow rate Gr changes. When the discharging temperature Td has a variation $\Delta Td$ and first expansion valve 3 has a variation $\Delta LP$ in degree of opening, then, from the expression (6), variation $\Delta Td$ and variation $\Delta LP$ have a relationship represented by the following expression (7):

[expression 7]

$$\Delta Td \propto \Delta LP \propto \frac{\Delta Gr}{\sqrt{\rho_l(P_1 - P_2)}}. \qquad (7)$$

Figure 4:
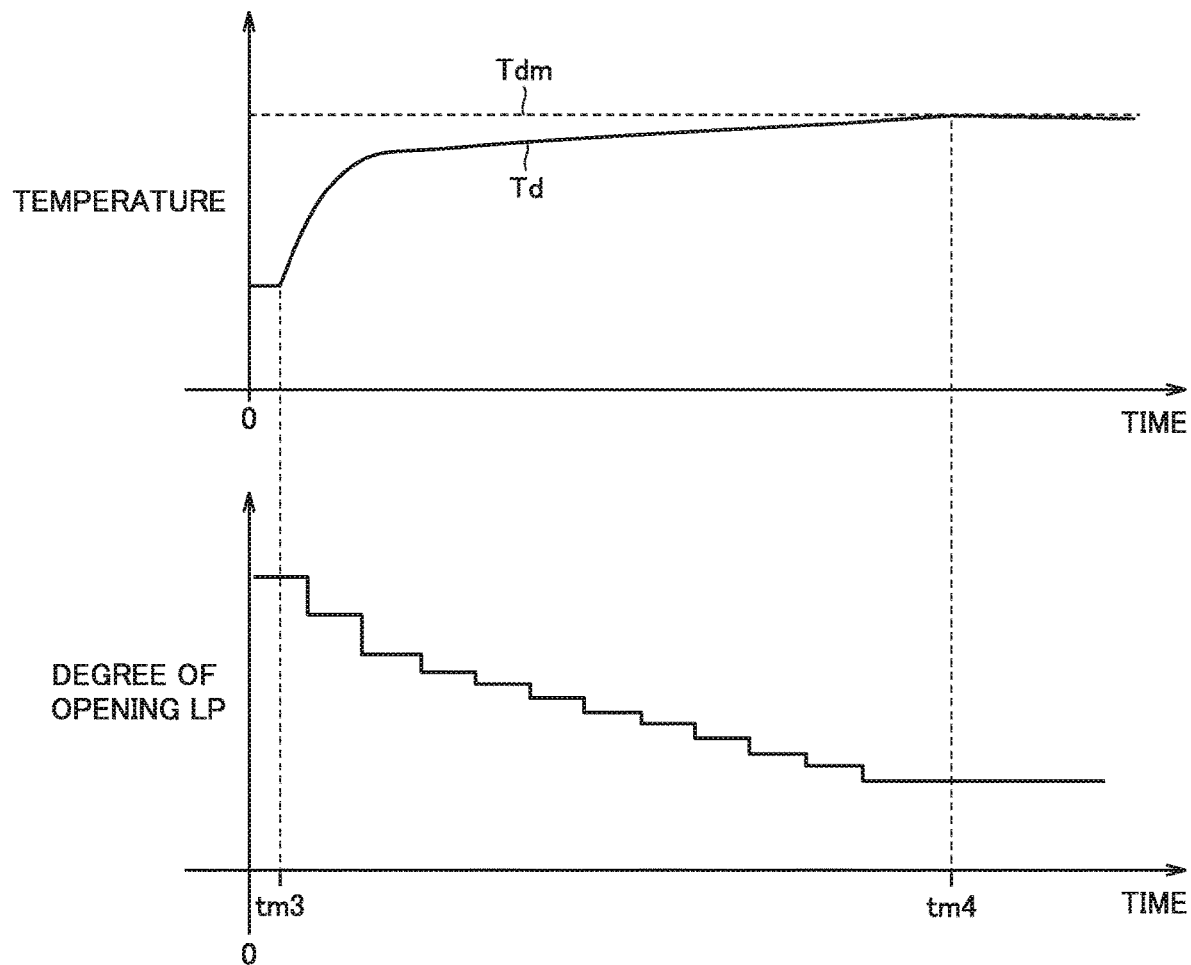
FIG. 4 is a timing plot for a discharging temperature and that for a degree of opening of the first expansion valve when refrigerant is circulated in an insufficient amount and the first expansion valve has its degree of opening controlled in the same manner as when the refrigerant is circulated in a sufficient amount.

FIG. 4 is a timing plot for the discharging temperature Td and that for the degree of opening LP of first expansion valve 3 when refrigerant is circulated in an insufficient amount and the first expansion valve has its degree of opening controlled in the same manner as when the refrigerant is circulated in a sufficient amount. Refrigerant is circulated in an insufficient amount for example when the refrigerant gradually leaks and is thus circulated in a reduced amount, i.e., due to slow leak. When refrigerant is circulated in an insufficient amount, compressor 1 reserves liquid refrigerant in a small amount in the shell of the compressor. When refrigerant is circulated in an insufficient amount, gas refrigerant in compressor 1 is less easily cooled by liquid refrigerant than when refrigerant is circulated in a sufficient amount. Therefore, as shown in FIG. 4, a time tm3 after compressor 1 is activated before the discharging temperature Td starts to rise is shorter than a time tm1 indicated in FIG. 3.

When refrigerant is circulated in an insufficient amount, first expansion valve 3 receives refrigerant in the form of wet steam, and accordingly, the density $\rho l$ of the expression (6) decreases. Accordingly, in order to change the discharging temperature Td as in the case where refrigerant is circulated in a sufficient amount, the variation $\Delta LP$ in the degree of opening of first expansion valve 3 needs to be larger than when refrigerant is circulated in a sufficient amount.

When refrigerant is circulated in an insufficient amount, the discharging temperature Td starts to rise earlier than when the refrigerant is circulated in a sufficient amount, and accordingly, the temperature difference $\Delta Ta$ between the discharging temperature Td and the target discharging temperature $Td_m$ decreases earlier than when refrigerant is circulated in a sufficient amount. When the temperature difference $\Delta Ta$ decreases, the amount of operation $\Delta LPop$ decreases according to the expression (4). As a result, the discharging temperature Td changes dully, and a time tm4 after the discharging temperature Td reaches the target discharging temperature $Td_m$ before air conditioner 100 stabilizes is longer than a time tm2 shown in FIG. 3.

Accordingly, in the first embodiment, whether refrigerant is circulated in an insufficient amount is determined based on the degree of subcooling SC of the refrigerant flowing into first expansion valve 3, and a control constant Kp2 applied when the degree of subcooling SC is not ensured is set to be larger than a control constant Kp1 applied when the degree of subcooling SC is ensured. By making the control constant Kp2 larger than Kp1, even when refrigerant is circulated in an insufficient amount, the amount of operation $\Delta LPop$ of the same extent as when the refrigerant is circulated in a sufficient amount can be ensured. As a result, a period of time before air conditioner 100 stabilizes can be reduced.

When the degree of subcooling SC is ensured and first expansion valve 3 receives refrigerant in the form of liquid, the refrigerant normally has a density $\rho l$ of about 860 to 1000 kg/m³. In contrast, when the degree of subcooling SC is not ensured and first expansion valve 3 receives refrigerant in the form of wet steam having a dryness of about 0.15, the refrigerant has a density $\rho l$ of about 300 kg/m³. A term in the expression (7) that includes the density $\rho l$ in the denominator varies about twice between when first expansion valve 3 receives refrigerant in the form of liquid (or when refrigerant is circulated in a sufficient amount) and when first expansion valve 3 receives refrigerant in the form of wet steam (or when refrigerant is circulated in an insufficient amount). When refrigerant is circulated in an insufficient amount, ensuring that the discharging temperature has a variation ΔTd of the same extent as when refrigerant is circulated in a sufficient amount requires first expansion valve 3 to have a degree of opening with a variation ΔLP about twice as large as when the refrigerant is circulated in a sufficient amount. By making the control constant Kp2 about twice as large as Kp1, the amount of operation ΔLPop can be approximately doubled. As a result, even when refrigerant is circulated in an insufficient amount, the variation ΔLP of the same extent as when refrigerant is circulated in a sufficient amount can be ensured.

The first embodiment does not require a configuration such as a receiver tank for reserving refrigerant in case that refrigerant is circulated in an insufficient amount. Further, it can also reduce an amount of refrigerant required for steadily operating the air conditioner. The air conditioner according to the embodiment can thus be manufactured at a reduced cost.

Figure 5:
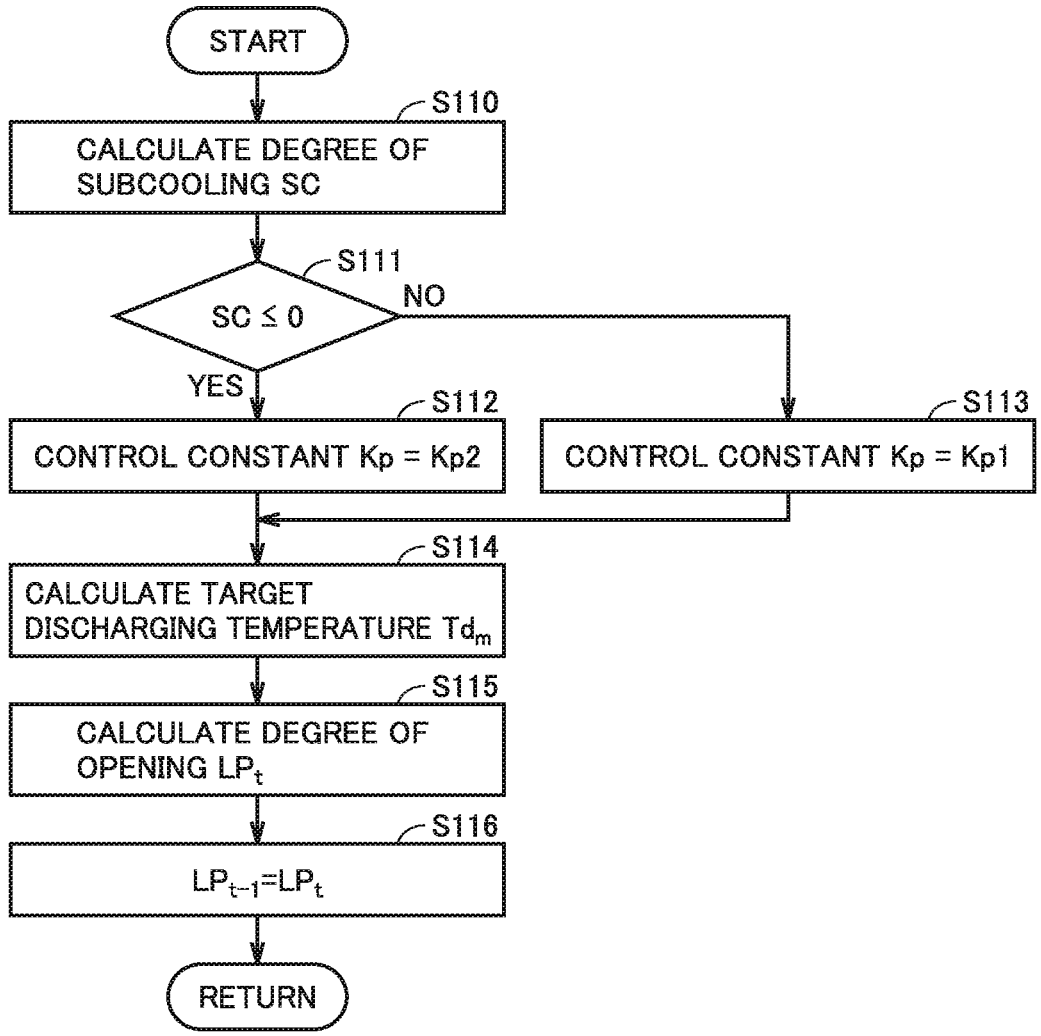
FIG. 5 is a flowchart of a process performed by a controller shown in FIGS. 1 and 2 for controlling the first expansion valve in degree of opening through feedback whenever a sampling time arrives.

FIG. 5 is a flowchart of a process performed by controller 11 shown in FIGS. 1 and 2 for controlling first expansion valve 3 in degree of opening through feedback whenever a sampling time arrives. Hereinafter, a step is simply denoted as S. As shown in FIG. 5, in S110, controller 11 calculates the degree of subcooling SC, and proceeds to S111.

Controller 11 in S111 determines whether the degree of subcooling SC is 0 or less. When the degree of subcooling SC is 0 or less (YES in S111), controller 11 proceeds to S112 to set the control constant Kp to Kp2 and proceeds to S114. When the degree of subcooling SC is larger than 0 (NO in S111), controller 11 proceeds to S113 to set the control constant Kp to Kp1, and proceeds to S114.

In S114, controller 11 calculates a target discharging temperature $Td_m$, and proceeds to S115. In S115, controller 11 calculates a degree of opening $LP_t$ for the current time, and proceeds to S116. In S116, controller 11 substitutes the degree of opening $LP_t$ for the immediately previous degree of opening $LP_{t-1}$ in preparation for the next sampling time, and ends the process.

Thus, the air conditioner according to the first embodiment can be enhanced in stability.

Second Embodiment

In the first embodiment has been described an example in which a degree of subcooling of refrigerant flowing into first expansion valve 3 is directly calculated. In a second embodiment will be described an example in which whether a degree of subcooling is ensured for the refrigerant flowing into the first expansion valve is estimated from the degree of opening of the first expansion valve.

Figure 6:
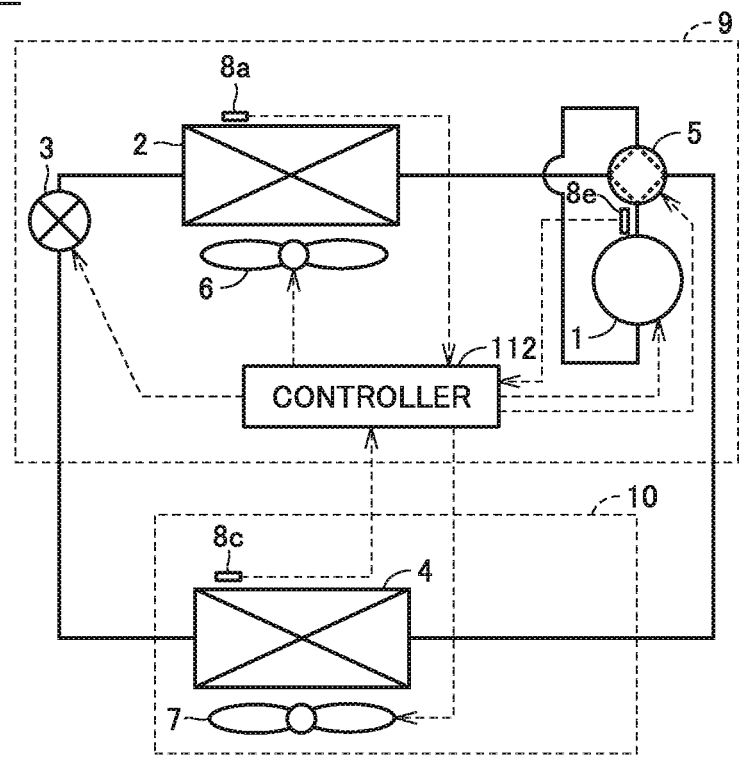
FIG. 6 is a functional block diagram showing a functional configuration of an air conditioner according to a second embodiment.

FIG. 6 is a functional block diagram showing a functional configuration of an air conditioner 200 according to the second embodiment. The configuration of air conditioner 200 shown in FIG. 6 corresponds to that of air conditioner 100 shown in FIG. 1 minus temperature sensors 8b and 8d and controller 11 replaced with a controller 112. The remainder in configuration is the same, and accordingly, will not be described redundantly.

Figure 7:
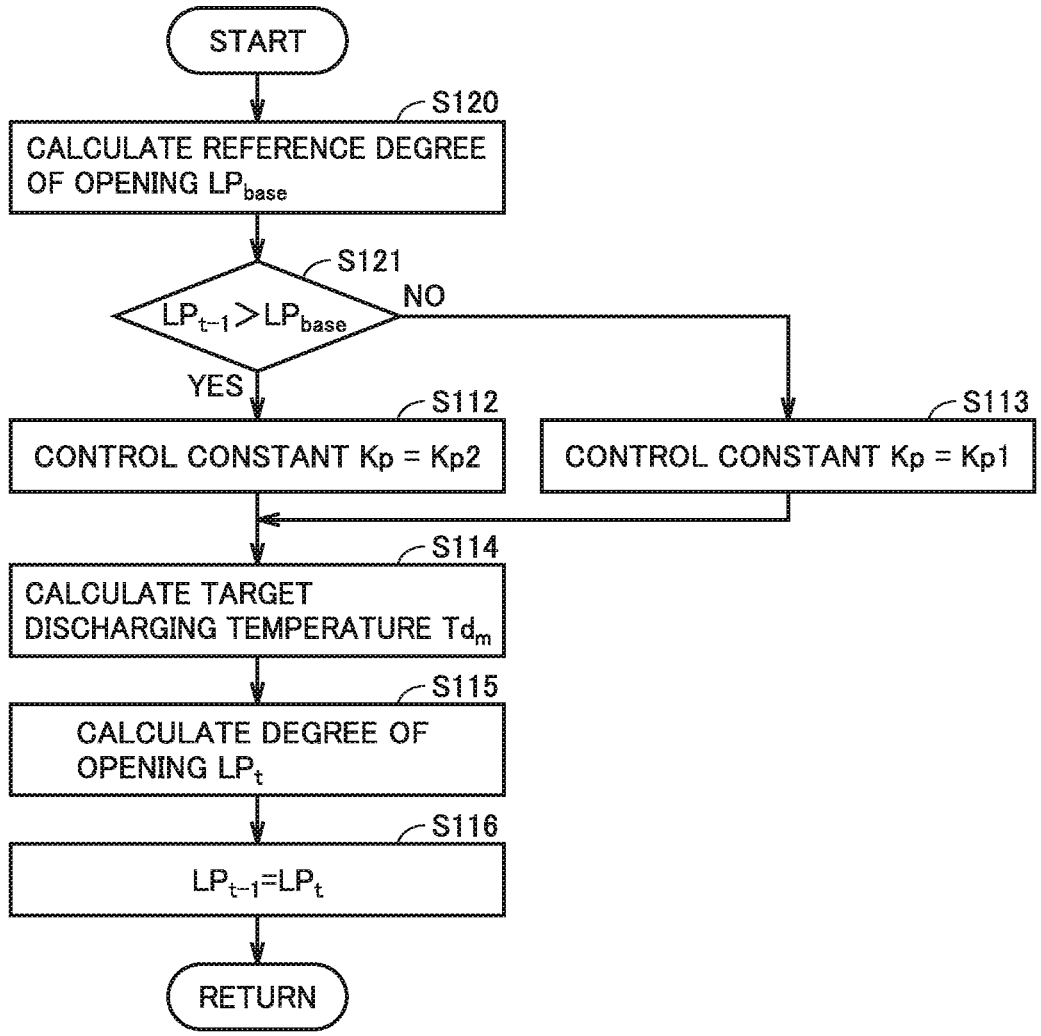
FIG. 7 is a flowchart of a process performed by a controller shown in FIG. 6 for controlling the first expansion valve in degree of opening through feedback whenever a sampling time arrives.

FIG. 7 is a flowchart of a process performed by controller 112 shown in FIG. 6 for controlling first expansion valve 3 in degree of opening through feedback whenever a sampling time arrives. The FIG. 7 process corresponds to the FIG. 5 process with S110 and S111 replaced with S120 and S121, respectively.

As shown in FIG. 7, controller 112 calculates a reference degree of opening $LP_{base}$ in S120, and proceeds to S121. In S121 controller 112 determines whether first expansion valve 3 has a degree of opening $LP_{t-1}$ larger than the reference degree of opening $LP_{base}$. When the degree of opening $LP_{t-1}$ is larger than the reference degree of opening $LP_{base}$ (YES in S121), controller 112 determines that a degree of subcooling is not ensured for the refrigerant flowing into first expansion valve 3, and proceeds to S112. When the degree of opening $LP_{t-1}$ is equal to or smaller than the reference degree of opening $LP_{base}$ (NO in S121), controller 112 determines that the degree of subcooling is ensured for the refrigerant flowing into first expansion valve 3, and proceeds to S113. Controller 112 performs S112 to S116 as it does in the first embodiment, and ends the process.

The reference degree of opening $LP_{base}$ is a degree of opening of first expansion valve 3 that is required when it is assumed that the degree of subcooling is ensured for the refrigerant flowing into first expansion valve 3 (that is, the refrigerant is in the form of liquid). When the refrigerant flowing into first expansion valve 3 has density $\rho_{l\_base}$ [kg/m³] and pressure $P_{h\_base}$ [MPa], and the refrigerant released from first expansion valve 3 has pressure $P_{l\_base}$ [MPa], the reference degree of opening $LP_{base}$ is represented by the following expression (8):

[expression 8]

$$LP_{base} = A_2 \cdot \frac{V_{st} \cdot F_z \cdot \eta_v \cdot \rho_s}{\sqrt{\rho_{l\_base}(P_{h\_base} - P_{l\_base})}}. \tag{8}$$

A constant $A_2$ is a constant determined by a characteristic of first expansion valve 3. The density $\rho_{l\_base}$ is a numerical value of about 800 to 1000. The stroke volume $V_{st}$ and the volumetric efficiency rev are values determined from the specification of compressor 1. The density ρs, the pressures $P_{h\_base}$ and the $P_{l\_base}$ are calculated from the temperatures obtained from temperature sensors 8a and 8c.

Thus, the air conditioner according to the second embodiment can be enhanced in stability.

Third Embodiment

In the first and second embodiments, a single-type air conditioner including one indoor unit has been described. An air conditioner according to an embodiment may be a multi-type air conditioner including a plurality of indoor units. In a multi-type air conditioner, liquid refrigerant stagnates in a plurality of indoor heat exchangers, and refrigerant is more likely circulated in an insufficient amount than in a single-type air conditioner. In a multi-type air conditioner, when refrigerant is circulated in an insufficient, it is more necessary to increase a control constant for the degree of opening of an expansion valve than in a single-type air conditioner. Accordingly, in a third embodiment, a multi-type air conditioner including two indoor units will be described.

Figure 8:
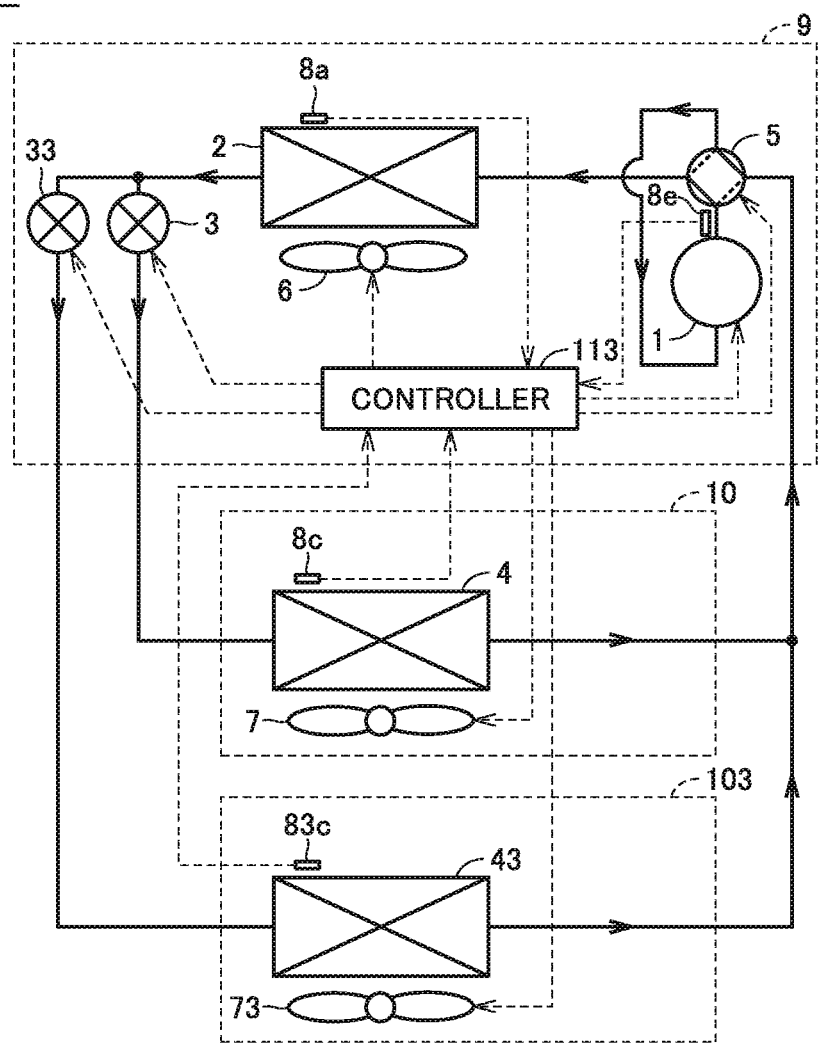
FIG. 8 is a functional block diagram showing a functional configuration of an air conditioner according to a third embodiment together with how refrigerant flows in a cooling operation.
Figure 9:
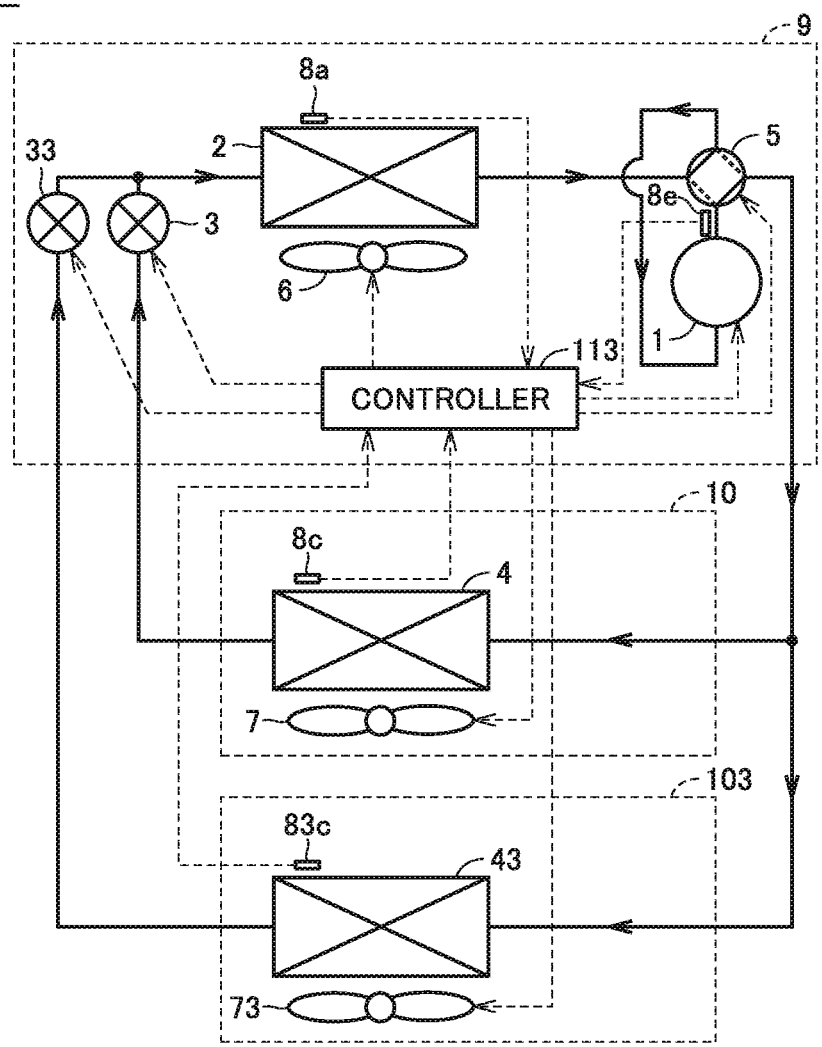
FIG. 9 is a functional block diagram showing a functional configuration of the air conditioner according to the third embodiment together with how refrigerant flows in a heating operation.

FIGS. 8 and 9 are functional block diagrams showing a functional configuration of an air conditioner 300 according to the third embodiment. FIG. 8 shows how refrigerant flows in the cooling operation. FIG. 9 shows how refrigerant flows in the heating operation. The configuration of air conditioner 300 shown in FIG. 8 corresponds to that of air conditioner 200 shown in FIG. 6 with an indoor unit 103 and a second expansion valve 33 added and controller 11 replaced with a controller 113. The remainder in configuration is the same, and accordingly, will not be described repeatedly.

As shown in FIG. 8, indoor unit 103 includes an indoor heat exchanger 43 and an indoor fan 73. In the cooling operation, the refrigerant circulates in the order of compressor 1, outdoor heat exchanger 2, first expansion valve 3 and indoor heat exchanger 4, and circulates in the order of compressor 1, outdoor heat exchanger 2, second expansion valve 33 and indoor heat exchanger 43. As shown in FIG. 9, in the heating operation, the refrigerant circulates in the order of compressor 1, indoor heat exchanger 4, first expansion valve 3 and outdoor heat exchanger 2, and circulates in the order of compressor 1, indoor heat exchanger 43, second expansion valve 33 and outdoor heat exchanger 2.

FIG. 10 is a flowchart of a process performed by controller 113 shown in FIGS. 8 and 9 for controlling first expansion valve 3 and second expansion valve 33 in degree of opening through feedback whenever a sampling time arrives. The FIG. 10 process corresponds to the FIG. 7 process with S130 performed between S115 and S116. In the third embodiment, an amount of operation for a degree of opening for first expansion valve 3 is represented as $\Delta LP1_{op}$, and an amount of operation for a degree of opening for second expansion valve 33 is represented as $\Delta LP2_{op}$. In the third embodiment, the degree of opening $LP_t$ is a sum of the degree of opening of first expansion valve 3 and the degree of opening of second expansion valve 33.

Controller 113 performs S120 to S115 to calculate a degree of opening $LP_t$ for the current time, as it does in the second embodiment, and subsequently, proceeds to S130. In S130, controller 113 sets the amount of operation $\Delta LP_{op}$ multiplied by α as the amount of operation $\Delta LP1_{op}$ and the amount of operation $\Delta LP_{op}$ multiplied by β as the amount of operation $\Delta LP2_{op}$, and proceeds to S116. In S116, controller 113 substitutes the degree of opening $LP_t$ for the immediately previous degree of opening $LP_{t-1}$, and ends the process.

The sum of α and β is 1. A ratio of the heat exchange capacity of indoor heat exchanger 43 to the heat exchange capacity of indoor heat exchanger 4 is α to β. As the heat exchange capacity, the heat exchanger's rated capacity [W/K] can be used for example.

S130 of FIG. 10 may be performed between S115 and S116 of the FIG. 5 process in the first embodiment when the temperature of the refrigerant flowing between outdoor heat exchanger 2 and first expansion valve 3, the temperature of the refrigerant flowing between outdoor heat exchanger 2 and second expansion valve 33, the temperature of the refrigerant flowing between indoor heat exchanger 4 and first expansion valve 3, and the temperature of the refrigerant flowing between indoor heat exchanger 43 and second expansion valve 33 can be obtained.

Thus, the air conditioner according to the third embodiment can be enhanced in stability.

The embodiments disclosed herein are also planned to be combined together as appropriate within a range without contradiction. It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST 1 compressor, 2 outdoor heat exchanger, 3 first expansion valve, 4, 43 indoor heat exchanger, 5 four-way valve, 6 outdoor fan, 7, 73 indoor fan, 8a-8e temperature sensor, 9 outdoor unit, 10, 103 indoor unit, 11, 112, 113 controller, 33 second expansion valve, 100, 200, 300 air conditioner.

The invention claimed is:
1. An air conditioner in which refrigerant circulates, the air conditioner comprising:
a compressor;
a first heat exchanger;
a first expansion valve;
a second heat exchanger; and
a controller configured to change an opening degree of the first expansion valve by a first operation amount according to a temperature difference between a target temperature and a temperature of the refrigerant discharged by the compressor,
the refrigerant circulating through the compressor, the first heat exchanger, the first expansion valve, and the second heat exchanger,
a first ratio of the first operation amount to the temperature difference when a specific condition is satisfied being larger than a second ratio of the first operation amount to the temperature difference when the specific condition is not satisfied, the specific condition indicating that a degree of subcooling of the refrigerant flowing between the first heat exchanger and the first expansion valve is smaller than zero.

2. The air conditioner according to claim 1, wherein the controller is configured to calculate the degree of subcooling from a temperature of the refrigerant flowing through the first heat exchanger, a temperature of the refrigerant flowing between the first heat exchanger and the first expansion valve, a temperature of the refrigerant flowing between the first expansion valve and the second heat exchanger, and a temperature of the refrigerant flowing through the second heat exchanger.

3. The air conditioner according to claim 1, wherein
the specific condition includes a condition that the opening degree of the first expansion valve is larger than a reference opening degree, and
the controller is configured to calculate the reference opening degree from a temperature of the refrigerant flowing between the first heat exchanger and the first expansion valve and a temperature of the refrigerant flowing through the second heat exchanger.

4. The air conditioner according to claim 1, further comprising:
a third heat exchanger; and
a second expansion valve, wherein
the refrigerant circulates through the compressor, the first heat exchanger, the first expansion valve, and the second heat exchanger, and also circulates through the compressor, the first heat exchanger, the second expansion valve, and the third heat exchanger, and
the controller is configured to change an opening degree of the second expansion valve by a second operation amount so that a third ratio of the second operation amount to the first operation amount is a fourth ratio of a heat exchange capacity of the third heat exchanger to a heat exchange capacity of the second heat exchanger.

\* \* \* \* \*